July 17, 1951  H. P. HENDERSON ET AL  2,560,951
EMBEDDED SCREW-THREADED SOCKET
Filed Oct. 18, 1948  2 Sheets-Sheet 1

Harold P. Henderson
Philip Kaplan } Inventors,
By Emil Kuehhart
Attorney.

July 17, 1951  H. P. HENDERSON ET AL  2,560,951
EMBEDDED SCREW-THREADED SOCKET
Filed Oct. 18, 1948  2 Sheets-Sheet 2
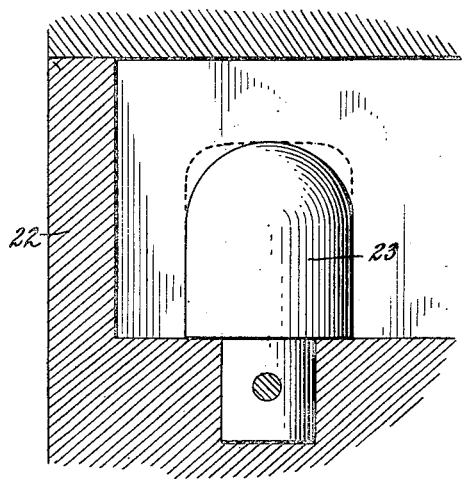
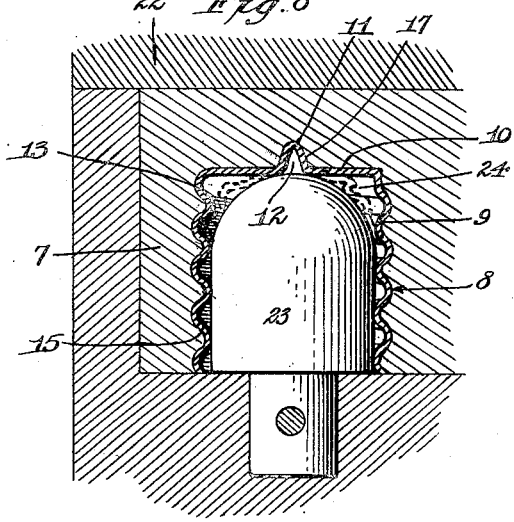
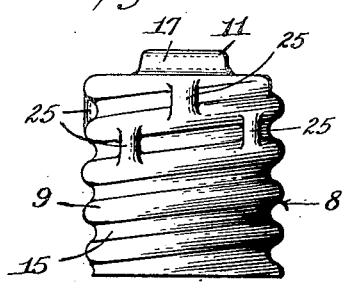
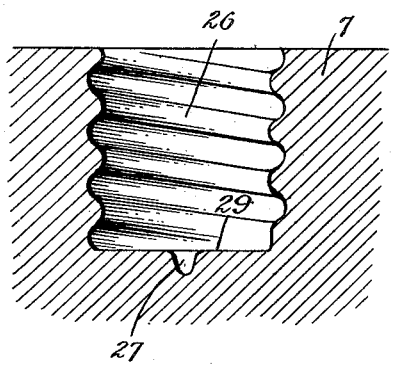
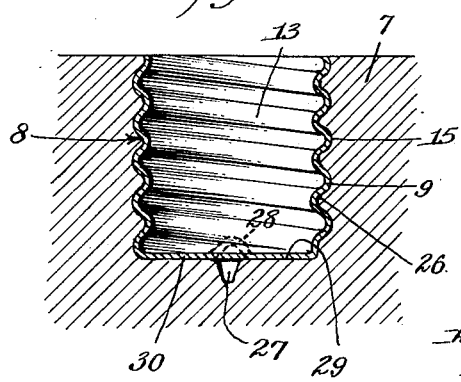
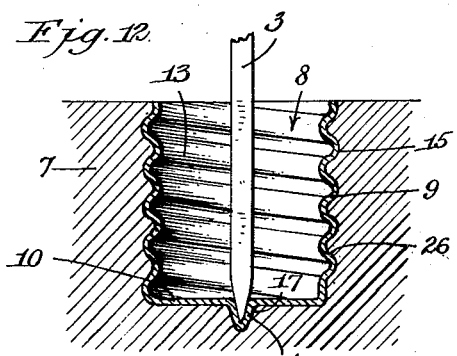
Harold P. Henderson
Philip Kaplan  Inventors
By Emil Neuhart
Attorney Patented July 17, 1951

2,560,951

UNITED STATES PATENT OFFICE 2,560,951

EMBEDDED SCREW-THREADED SOCKET

Harold P. Henderson and Philip Kaplan, Buffalo, N. Y., assignors to Clover Industries, Inc., Buffalo, N. Y., a corporation of New York Application October 18, 1948, Serial No. 55,086

4 Claims. (Cl. 72—105)

Our invention relates to embedded screw-threaded sockets, such as are used to secure objects of various kinds to a base or support in which the sockets are embedded, usually by molding a plastic body around the sockets.

Such sockets are now in common use, but are deficient in that the parts secured therein, when subjected to strains, as they invariably are, cause the sockets to break the bond between the same and the plastic material in which they are embedded, with the result that they easily unthread from the material and fail to properly retain the parts threaded therein, or the parts carried by the base or support through the medium of the parts threaded therein.

It is one of the objects of our invention to so mold the sockets in a base or support that, when the bond or cohesion between the socket and the molded material of the base or support is broken under strain applied to the sockets, the latter will be prevented from unscrewing or otherwise becoming loosened to a degree that would render the parts fastened thereto non-rigid, or wabbly. So arranged, many sockets may be embedded in a panel or base in close proximity to each other and parts fastened to the panel by means of threaded portions threaded in said sockets or by means of screws passed through such parts and entered in the sockets.

Another object is to provide the socket with a stop-face which confronts and preferably is bonded to an abutment area formed in the base or support so as to prevent rotation of the socket within its base or support under usual strains applied to sockets of the type of this invention.

A further object is to provide a sheet-metal socket stamped into cup-shape and having interior and exterior screw-threads rolled or otherwise formed therein, the interior screw-threads designed to receive an object having exterior machined screw-threads and the complete socket being embedded in a base or support molded around the same, said socket being constructed in one of its many forms with a stop-face trending in a direction at an angle to the peripheral surface of the socket and said peripheral surface and said stop face being bonded to the molded material forming the base or support, the stop-face and the bonding of the peripheral wall of the socket preventing rotation and consequently loosening of the latter in the base or support.

A still further object is to provide a socket of the type mentioned which is formed of thin sheet metal fashioned into cup-shape and having a projection on the outer face of its closed end constructed to prevent unthreading of said socket from its molded base or support under such force or strains as would under normal use be applied to the socket, the sheet metal from which the socket is formed being sufficiently resilient that under abnormal force applied in a direction to unthread the socket from its base or support, said projection would become deformed and caused to be forced into the interior of the socket without destroying the cavity into which it was originally molded, with the result that the outer face of the end wall of the socket would be devoid of any projecting part and the socket, by means of a suitable tool entered therein could be easily replaced with another socket in the manner hereinafter set out.

With the above and other objects in view, our invention consists in the novel features of construction, and in the arrangement and combination of parts to be hereinafter described and more particularly pointed out in the subjoined claims.

In the drawings:

Fig. 7 is a sectional view through a portion of a flask in which plastic material having our improved socket therein is molded; the flask having a socket support or locator stud shown in elevation over which a socket is to be positioned preparatory to embedding the same in plastic material.

Fig. 8 is a similar view, showing the flask filled with plastic material with the socket embedded therein while positioned over the support or locator stud.

Fig. 9 is an elevational view of a modified form of our invention.

Fig. 10 is a sectional view of a plastic base or support from which the socket has been removed to place the base or support in condition to receive a new socket.

Fig. 11 is a similar view showing a new partially formed socket inserted into the base or support.

Fig. 12 is a view similar to Fig. 11 showing the new socket, which by means of a suitable tool provided with an elongated projection, serves to prevent unthreading of the socket or even the slightest rotary movement of the socket from within the base or support capable of breaking the bond between the two.

Figure 1:
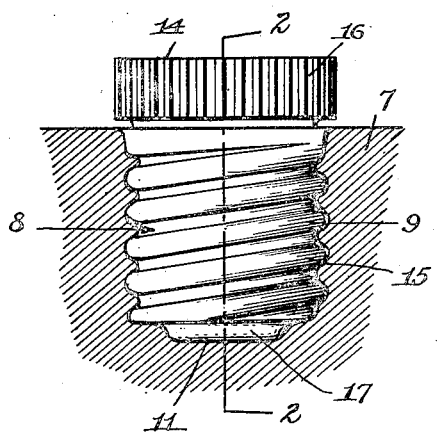
Fig. 1 is an elevational view of one embodiment of our improved socket showing the same embedded or molded in a suitable base and having a screw-nipple threaded thereinto.
Figure 2:
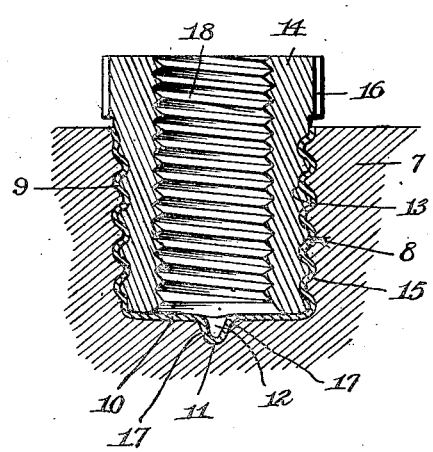
Fig. 2 is a longitudinal section taken on line 2—2, Fig. 1.
Figure 3:
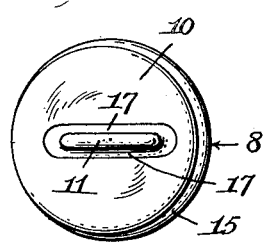
Fig. 3 is an inner end view of the socket shown in Figs. 1 and 2.

In the embodiment of our invention shown in Figs. 1, 2 and 3, the reference numeral 7 designates a base or support molded of plastic material and hardened to form a rigid board-like object. When molding the latter to desired form, our improved socket, designated 8, is molded into it so that its outer open end is flush with the face of the board-like object, or substantially so, which object may, of course, be molded to any desired shape and which we prefer to term a base or support, regardless of its form or shape.

In most instances, a plurality of sockets are molded into the base or support and each socket is formed of sheet metal of various kinds varying in gauge, depending on the sizes of the sockets. In some instances the sheet metal is quite thin and resilient.

The socket is stamped into cup-like formation to provide a peripheral wall 9 and an inner end or bottom wall 10. In one form of our invention, the inner end or bottom wall has an outwardly-extending elongated projection 11 which is preferably diametrically disposed and forms a similarly-disposed recess or depression 12 in the inner face of said inner end or bottom wall, which may be referred to as the closed end of the socket.

The peripheral wall of the socket has interior screw-threads 13 rolled or otherwise formed therein for threaded engagement of the exterior screw-threads of a screw-nipple 14, or any other threaded object or part.

Rolling or otherwise forming the interior screw-threads 13 in the socket results in the forming of exterior screw-threads 15 in the peripheral wall of the socket, but such exterior screw-threads serve only as means to prevent axial movement of the socket, while the elongated projection prevents rotation of the same; thereby assuring a secure bonding of the socket in its base or support.

It may here be stated that the forming of the exterior screw-threads 15 in the socket is merely incidental to the forming of the interior screw-threads 13; the latter being sized and shaped to effectively receive the machined exterior screw-threads of the screw-nipple 14 or any other screw-threaded object; said nipple having a milled or serrated rim 16 at its outer end to facilitate the fastening of the nipple in the socket.

The outer faces 17 of the elongated projection or abutment 11 on the closed end of the socket extends substantially axially of the socket and serve as stop faces and these faces, by reason of the material of the base or support being molded around the socket, are bonded to all exterior portions of the latter. Consequently the region of the molded material in contact with the projection 11 is in the form of a cavity and the sides or stop faces 17 of said cavity serve as abutments and prevent rotation of the socket under any strain to which it is normally subjected, even if under strain the bond between the molded material and the socket were broken.

It will be apparent that the elongated projection 11 cooperates with the exterior screw-threads in the socket and that therefore the socket is held against withdrawal from the base or support, even though the bond between the two is broken, since the exterior screw-threads 15 prevent accidental axial movement of the socket and the stop face or faces 17 prevent like rotative movement thereof.

Since the stop faces 17 are in a plane which extends through the perimeter of the socket, it will be clear that they will be positive in their action to prevent rotation of the socket under any strain which would be applied to the socket by the attachment of an object thereto.

The screw-nipple 14 is provided with interior screw-threads 18 and when the nipple is securely threaded in the socket, an anchored fastening element is provided which will serve to fasten any object to the base or support 7; it being only necessary to pass a suitable screw through the object to be fastened and enter the screw threads in the screw-nipple.

While this general means of fastening various types of fittings and other objects to molded bases or supports is now in common use, the tendency of the nipple or other object entered in the socket, when under strain, is to loosen and to cause the socket to loosen and rotate in the base or support, only to eventually become withdrawn from the latter, or to become so loose as to improperly carry the weight of the object or part fastened to the base or support; in some instances resulting in severe damage and injury to attendants.

Figure 4:
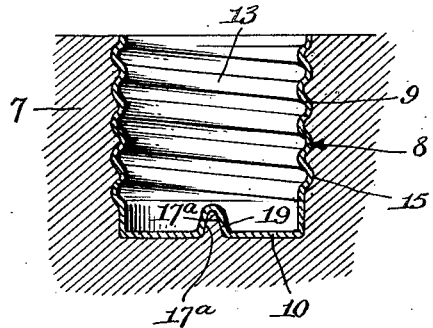
Fig. 4 is a longitudinal section of a modified form of our invention, the socket being embedded in a molded base or support.

In the modification shown in Fig. 4 we have shown stop-faces 17$^a$ provided by forming an elongated exterior depression 19 diametrically in the end or bottom wall 10 of the socket. In this instance, when molding the material around the socket, or the socket in the material as it may be stated, the plastic material enters the depression and the areas of the base or support in contact with the stop-faces 17$^a$ serve as abutments for the latter.

Figure 5:
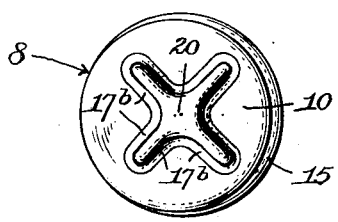
Figs. 5 and 6 are inner end views of further modified forms of sockets.

In the modification shown in Fig. 5, the bottom wall has an X or cross-like projection 20 extending outwardly therefrom, providing stop-faces 17$^b$ against which the material of the base or support is molded to form abutments for said stop faces.

Figure 6:
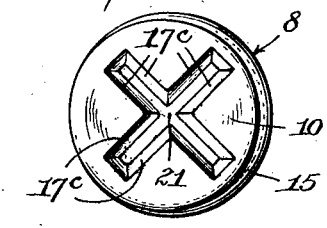

In the modification shown in Fig. 6, the bottom wall has an X or cross-like depression 21 formed in its outer surface, providing stop-faces 17$^c$ against which the material of the base or support is molded to form abutments in the base or support for said stop-faces.

The stop-faces shown and described are non-circular and therefore have straight-lined regions, but they may, in their broadest aspect, include circular projections or depressions if off center of the socket or eccentric to the peripheral wall of the latter or the screw threads therein, and we therefore include under the term "stop-faces" all faces formed by depressions or projections in or on the wall or walls of the socket which lie against abutments in the base or support offering resistance to rotary unthreading movement of the socket, and therefore the stop-face or faces provided under this invention need not necessarily be such that trend in a plane which crosses the periphery of the socket, although such stop-faces are believed most effective in preventing accidental rotative movement of the socket under severest strains, due to the greater resistance to rotative movement which they offer. The stop-faces may, therefore, be termed resistance-faces or areas.

In molding the sockets in plastic material, a mold or flask is used, suggestively shown in Figs. 7 and 8, and designated by the numeral 22. Rising from the bottom wall of the mold or flask are locator socket-supports or locators in the form of cylindrical studs 23 of a diameter to snugly fit the sockets which are placed over said studs and are axially coincident therewith.

The interior dimensions of the mold or flask determines the dimensions which the object is to have in which the sockets are to be molded, and the locator studs are so spaced on the bottom of the mold or flask that the sockets will be molded in the objects with their axes at predetermined points and the edges at their open ends flush with the face of the molded object, hereinbefore referred to as a base or support.

It will be noted that the outer or free end of the locator stud or studs, as the case may be, are rounded, and as shown in Fig. 9 this rounded end may be semispherical, or as shown in dotted lines the end face thereof may be flat and its corners rounded. Such formation is to facilitate the placing of the sockets over the locator studs, a decided advantage when socketed objects of this kind are produced in large quantities.

The sockets 8 invariably have flat closed ends and when positioned over a socket locator having rounded ends, a space 24 intervenes between the locator and the angular portion of the socket formed by the peripheral wall of the socket and the end wall thereof.

After positioning a socket over a locator, plastic material is injected into the mold or flask under high pressure and while the major portion of the peripheral wall is firmly backed-up by the socket locator, that portion of the socket wall outwardly enclosing the space 24 is unsupported and subject to collapse under the external pressure applied thereto by the plastic material being injected into the mold or flask under high pressure, the collapse of said wall portion being indicated by dotted lines in Fig. 8. Thus the socket is rendered useless and in some instances the usefulness of the entire base or support destroyed, even though some of the sockets molded into the base or support are perfect.

It is, of course, understood that the free end of the locator may be made flat and have its corner comparatively sharp to conform to the interior of the socket at its closed end, and this may be practiced to advantage when a base or support with one or only a few sockets is being molded and only a few of such bases or supports are required; but where bases having a large number of sockets embedded therein and being manufactured in extremely large quantities for various purposes is required, speed in production is highly essential, particularly when a large portion of the cost of an object is due to the cost of labor. Consequently we consider the provision of means for speedily applying sockets over locators to be important, especially when the locators are so shaped that the sockets automatically gravitate over the locators and become axially alined with the locators.

While the free and rapid placement of the sockets over the socket locators is a decided advantage, the possible or even probable attendant disadvantage of the socket wall collapsing, depending on the gauge of metal employed to form the socket and the pressure used in the mold or flask, must be overcome and this we accomplish by forming short webs 25 between adjacent convolutions formed on the exterior of the socket. These webs are spaced around the socket, following the spiral of the screw-thread from the closed end of the socket outwardly, at least along the unsupported wall region, and they rise from the valleys of the spiral thread and have their crests even with the crests of the screw thread.

If desired, the webs 25 may extend the full length of the peripheral walls of the sockets, especially when the sockets are formed of very light gauge sheet metal, and they may be variously spaced around the socket.

It may here be stated that the webs 25 also serve as means to prevent rotative movement of the socket in the plastic base or support, even though the cleavage or bond between the socket and the plastic material is broken, since the surfaces of the webs at opposite sides of their crests serve as stop faces and the regions of the plastic material which they contact serve as abutments.

Large instrument boards and other large bases or supports having a large number of sockets embedded therein require an occasional socket replacement for any one of various reasons. In such instances the socket is unthreaded and a replacement socket, devoid of projections or depressions on its end wall, is threaded into the threaded cavity or socket hole 26 formed in the plastic object when molding the socket therein. If the socket to be replaced embodies our invention, as disclosed in Figs. 1 to 6, a suitable tool is used to engage and grip the inner surface of the peripheral wall of the socket; for example, a slightly tapered tool having longitudinal teeth to bite into the metal of the socket when rotating the tool counter-clockwise. Upon exerting sufficient force or pressure rotatively, the projection 11, or one otherwise formed on the socket, will become deformed and yield and under continued and what may be called super-normal or excessive force or pressure will be forced inwardly by wedging action against the abutment wall of its cavity 27, as shown by dotted lines at 28, Fig. 11, so that all portions thereof lie above the inner end wall 29 of the socket hole 26 formed by originally molding the socket in the plastic base or support, after which the socket may be completely unthreaded and the replacing socket threaded into said socket hole.

By reason of the hardness and firmness of the plastic material, the projection cavity 27 will remain practically intact and ready to receive a new socket projection, such as 11, or one serving a like purpose. The replacing socket as stated, has a flat inner end wall 30, as shown in Fig. 11, and when threaded into the socket cavity, no portion thereof enters in the projection cavity 27. Therefore, to embody our invention in the replacing socket so as to prevent unthreading of the socket, an extruding tool 31 is employed which is entered in the replacing socket, as shown in Fig. 12, and its inner end is shaped to conform to the projection cavity 27 in the base or support. Now upon tapping against the outer end of this tool or otherwise exerting pressure against the end wall over the region covering said projection cavity, the overlying portion of said end wall will be forced into said cavity, as shown in Fig. 12, forming the projection 11 of our invention and locking the socket against rotary unthreading motion.

It is, of course, apparent that while a socket having the thread-connecting webs will prevent rotary unthreading motion of the socket without providing the latter with an end projection, such as 11, or an end projection of different formation serving a like purpose, such a socket cannot be removed and replaced with another without damaging the threads formed in the socket hole or cavity.

So far as known to us, sockets embedded in plastic material are cast, or machined from rod or other suitable stock material, depending on the sizes of the sockets used, and they are exteriorly knurled or otherwise roughened to aid in establishing a bond with the plastic material surrounding them. Such sockets are interiorly machine screw-threaded in order to receive exteriorly machine screw-threaded nipples, screws, or other fittings.

Sockets so made are costly compared to the cost of producing this invention, and cannot be made commercially as small as required in many instances. Moreover, the smaller sizes capable of being so made do not possess the bonding qualities, which is an essential feature of our invention.

In our invention the pitch of the screw-threads formed in the peripheral wall of the socket may be varied from an extra fine thread, for example 40 threads to an inch, to an extremely coarse thread, depending on the diameter or size of the socket; but in all cases the inner screw-thread of the socket is similar to a machine-cut thread and capable of receiving into it, a machine-cut threaded object of mating diameter and pitch, as well as other types of threads.

When the rolled interior screw-threads in the socket member are approximately from 20 to 40 to an inch, the valleys in the threads are sharply defined to conform to the sharp ridges or crests of the exterior machine-cut screw-threads on the part to be entered in the socket, and in all cases, although the screw-thread is rolled in the socket wall, there is no play between the socket and the part entered therein, since both are threadingly tied together, as they would be if both screw-threads were machined to exactly the same pitch.

From the foregoing it will be apparent that we have provided a mounting in the form of a molded base or support for supporting or carrying parts or objects by utilizing sockets exteriorly threaded and provided interiorly with suitable means for fastening objects therein or by means of interiorly and exteriorly screw-threaded sockets molded into the mounting and provided with means to prevent rotative accidental withdrawal of the socket from the base, which last-mentioned means may be termed deformable rotary-resistance means.

Having thus described our invention, what we claim is:

1. A mounting for supporting objects from a molded base or attaching objects thereto comprising a cup-shaped socket formed of sheet metal and adapted to be molded into said base, said socket comprising an imperforate peripheral wall and an inner closed end wall, an inner screw-thread section on said peripheral wall which is integral therewith forming exterior screw-thread convolutions thereon, the inner threaded section being adapted to receive a threaded nipple or other fitting in the socket, said inner end wall having an abutment portion disposed eccentrically of said screw-thread and extending substantially axially of said socket which is adapted to interlock said end wall with said base and prevent accidental rotative movement of the socket and removal of the same from said base, said abutment portion being deformable with the application of excessive rotative force to the socket whereby the same may be dislodged from the base.

2. A mounting for supporting objects to a molded base as claimed in claim 17 wherein said abutment portion which is formed on said inner closed end wall extends diametrically of said end wall.

3. A mounting for supporting objects to a molded base as claimed in claim 17 wherein said exterior screw-thread convolutions comprise at least one web portion extending between adjacent convolutions and wherein said base comprises plastic material.

4. In combination, a plastic base having a socket hole provided with a projection-cavity in its bottom wall, a sheet metal socket having a peripheral wall and an inner closed end wall which socket is molded into said base, said socket having its peripheral wall provided with exterior screw-thread convolutions bonded to said base, abutment means formed on said inner end wall eccentric to the central rotational axis of said socket which is adapted to enter in said projection-cavity and interlock the socket with said base and prevent withdrawal of the same therefrom, said abutment being deformable under increased rotative force whereby said socket may be removed to receive a replacement socket.

HAROLD P. HENDERSON.
PHILIP KAPLAN.

REFERENCES CITED

The following references are of record in the file of this patent:

UNITED STATES PATENTS

| Number | Name | Date |
|---|---|---|
| 876,361 | Kraft | Jan. 14, 1908 |
| 985,762 | Ogden | Feb. 28, 1911 |
| 1,254,646 | Bausch | Jan. 29, 1918 |
| 1,321,081 | Behn | Nov. 11, 1919 |
| 1,349,137 | Morgan | Aug. 10, 1920 |
| 1,360,388 | Gaynor | Nov. 30, 1920 |
| 1,627,554 | Fisher et al. | May 10, 1927 |
| 1,812,434 | Eckstein | June 30, 1931 |
| 1,954,497 | Slick | Apr. 10, 1934 |
| 2,003,622 | Bateholts | June 4, 1935 |
| 2,033,643 | Neill | May 10, 1936 |
| 2,040,235 | Bateholts | May 12, 1936 |
| 2,423,432 | Barlow | July 8, 1947 |
| 2,545,045 | Rosan | Mar. 13, 1951 |

FOREIGN PATENTS

| Number | Country | Date |
|---|---|---|
| 130,115 | Switzerland | Nov. 30, 1928 |
| 562,562 | Great Britain | July 6, 1944 |

Certificate of Correction

Patent No. 2,560,951                                                                 July 17, 1951

HAROLD P. HENDERSON ET AL.

It is hereby certified that error appears in the printed specification of the above numbered patent requiring correction as follows:

Column 8, lines 13 and 18, for the claim reference numeral "17" read *1*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*